Aug. 19, 1924.

F. STULTZ 1,505,506

SPRING TRAP JAW GUARD

Filed Feb. 26, 1923

Inventor

Frank Stultz

Patented Aug. 19, 1924.

1,505,506

UNITED STATES PATENT OFFICE.

FRANK STULTZ, OF CANON CITY, COLORADO.

SPRING TRAP-JAW GUARD.

Application filed February 26, 1923. Serial No. 621,236.

*To all whom it may concern:*

Be it known that I, FRANK STULTZ, a citizen of the United States, residing at Canon City, in the county of Fremont and State of Colorado, have invented certain new and useful Improvements in a Spring Trap-Jaw Guard, of which the following is a specification.

This invention relates to improvements in the well known spring jaw traps and has for its prime object to provide an attachment which will prevent accidental disengagement of the jaws of the trap from the base plate when the trap is sprung by an animal.

A further object of the invention is to provide an attachment for the above indicated traps, which is simple in construction, durable, efficient for the purpose intended, and one that can be manufactured and attached to traps now in use at a very small cost.

These and like objects of the invention will be better understood as the description follows and as is specifically pointed out in the appended claims.

Referring to the accompanying drawing which forms a part of this specification,

Referring to the accompanying drawing in detail, like characters will be used to designate like parts in the different views.

Figure 1:
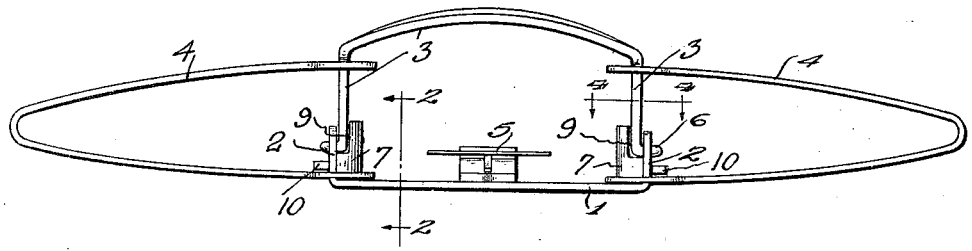
Figure 1 is a side elevational view of a spring jaw trap showing my attachment applied thereto.
Figure 2:
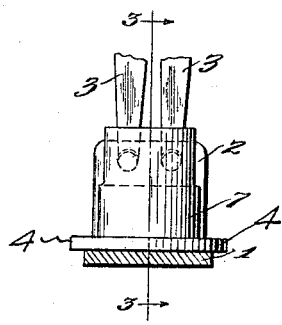
Figure 2 is an enlarged sectional view taken on line 2—2 of Figure 1.

In the drawing, the numeral 1 indicates the base of what is known as a spring jaw trap. The base has its ends bent at right angles and extending upwardly as at 2 and is provided with a pair of apertures in each upwardly extending end for receiving therein jaws 3, which are adapted to be moved in the position shown in Figure 1 under the influence of actuating springs 4. The numeral 5 indicates the platform for receiving the bait and the catch for holding the jaws in an open position.

It has been found from experience, which has resulted in the loss of thousands of dollars worth of furs and animals yearly to large trappers, that when the jaws 3 are sprung to the position indicated in Figure 1, that the reduced end 6 of the jaws have a tendency to become accidentally disengaged from the upwardly bent ends 2 of the base 1, which results in the animal being allowed to escape. With the use of my attachment, this loss is entirely eliminated.

Figure 3:
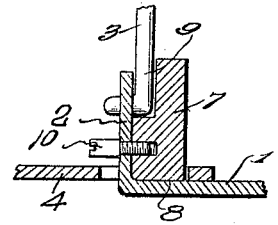
Figure 3 is an enlarged sectional view taken on line 3—3 of Figure 2.
Figure 4:
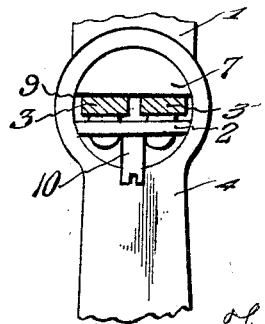
Figure 4 is an enlarged sectional view taken on line 4—4 of Figure 1.

My attachment or guard as I prefer to call same, is indicated as a whole by the numeral 7 and same consists of a semi-cylindrical piece of metal provided with a flat bottom 8 for engagement with the base 1 and having the upper portion of same cut away as at 9 to provide a recess or space for the jaws 3. After the jaws 3 have been placed in the upright ends 2, the guard is placed in the position as is clearly shown in cross section in Figure 3 and is secured in position by means of a lock screw 10, thus it can be readily seen that no matter with what force the jaws 3 are sprung, it is impossible for the jaws to move out of engagement with the end pieces 2, as any inward movement of the ends of the jaws will cause the same to strike against the upper portion of the guard 7.

In view of the foregoing description of my invention taken in connection with the accompanying drawing, it is thought that any further explanation as to the construction, operation, and objects of same is unnecessary.

While I have shown and described the preferred form of my guard, I realize that various minor changes may be resorted to, without departing from the spirit and scope of the invention as claimed, and therefore, I do not wish to limit myself to the exact details of construction shown, nor to the combination and arrangement of parts shown.

What I claim as new and desire to secure by Letters Patent is:

1. In an animal trap, in combination with a base plate having upwardly bent ends each of which are provided with apertures, jaws pivotally mounted in said apertures, and blocks mounted on said base plate and secured to said upwardly bent ends each having a notch therein adjacent the bent up end of the base plate to form a pocket for receiving the ends of the jaws for preventing accidental disengagement of said jaws from said bent ends.

2. In an animal trap, in combination with a base plate having upwardly bent ends each of which are provided with apertures, jaws pivotally mounted in said apertures, L-shaped blocks mounted on said base plate, screws extending through said bent ends and said L-shaped blocks to secure the same together, said bent ends and said L-shaped blocks forming pockets between the said ends and the upright of the L-shaped blocks for receiving the ends of the jaws for preventing accidental disengagement of said jaws from said bent ends.

In testimony whereof, I have affixed my signature in the presence of two witnesses.

FRANK STULTZ.

Witnesses:
  W. I. TUTTLE,
  JOSEPH VISLO.